(12) United States Patent
Ross

(10) Patent No.: US 8,737,400 B2
(45) Date of Patent: *May 27, 2014

(54) DATA STREAM PROCESSING FOR SEAMLESS STREAM SWITCHING

(75) Inventor: Tim Ross, Bedford, NH (US)

(73) Assignee: Broadcom Corporation, Irvine, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 13/079,908

(22) Filed: Apr. 5, 2011

(65) Prior Publication Data

US 2012/0087416 A1 Apr. 12, 2012

Related U.S. Application Data

(63) Continuation of application No. 11/736,989, filed on Apr. 18, 2007, now Pat. No. 7,920,603.

(60) Provisional application No. 60/863,495, filed on Oct. 30, 2006.

(51) Int. Cl.
*H04L 12/26* (2006.01)

(52) U.S. Cl.
USPC .......................................... 370/392

(58) Field of Classification Search
None
See application file for complete search history.

(56) References Cited

U.S. PATENT DOCUMENTS

| 6,925,097 | B2 | 8/2005 | Hagai et al. |
| 7,920,603 | B2 * | 4/2011 | Ross ............................ 370/535 |
| 8,233,781 | B2 * | 7/2012 | Nishi et al. .................... 386/353 |
| 2001/0038649 | A1 | 11/2001 | Hagai et al. |
| 2003/0169783 | A1 | 9/2003 | Coffin et al. |
| 2005/0068204 | A1 | 3/2005 | Jeon et al. |
| 2007/0277219 | A1 * | 11/2007 | Toebes et al. ................. 725/139 |
| 2008/0100631 | A1 | 5/2008 | Grearson et al. |
| 2008/0101421 | A1 | 5/2008 | Gordon et al. |

FOREIGN PATENT DOCUMENTS

EP 1 643 772 A 4/2006

OTHER PUBLICATIONS

European Search Report corresponding to European Application No. 07014622.0-2223, 4 pages, Jul. 15, 2008.
Corcoran, P., et al., "Fast A/V Channel Switching on Wireless Home Network", Computer as a Tool, 2005. EUROCON 2005, The International Conference on Belgrade, Serbia and Montenegro, Piscataway, NJ, USA, IEEE, vol. 2, pp. 1320-1323, Nov. 21, 2005.

(Continued)

*Primary Examiner* — Anh-Vu Ly
(74) *Attorney, Agent, or Firm* — McDermott Will & Emery LLP

(57) ABSTRACT

Presented herein are system(s), method(s), and apparatus for rapid switching between streams of data. In one embodiment, there is described a circuit for providing media. The circuit comprises a multiplexed stream processor, a queue, and a decoder. The multiplexed stream processor receives a multiplexed stream and filtering at least one elementary stream. The queue queues the at least one elementary stream. The decoder decodes the at least one elementary stream. The multiplexed stream processor filters at least another elementary stream instead of at least one elementary stream after issuance of a command to switch from the at least one elementary stream to the at least another elementary stream. The queue stores a portion of the at least one elementary stream after issuance of the command, said portion of the at least one elementary stream being written into the queue before issuance of the command. The decoder decodes the portion of the at least one elementary stream and the at least another elementary stream.

20 Claims, 4 Drawing Sheets

(56) References Cited

OTHER PUBLICATIONS

Anonymous, "Multiple Stream Decode Information Caching at Digital Video Decode-Points for Fast Source Switching" Research Disclosure, Mason Publications, Hampshire, UK, vol. 467, No. 13, Mar. 1, 2003.

Lau, et al., "Receiver Buffer Control for Variable Bit-Rate Real-Time Video", Discovering a New World of Communications. Chicago, Illinois, Proceedings of the International Conference on Communications, pp. 554-550, Jun. 14, 1992.

* cited by examiner

US 8,737,400 B2

DATA STREAM PROCESSING FOR SEAMLESS STREAM SWITCHING

RELATED APPLICATIONS

This application is a continuation of U.S. patent application Ser. No. 11/736,989, filed on Apr. 18, 2007, now U.S. Pat. No. 7,920,603, issued on Apr. 5, 2011, which claims priority to U.S. Provisional Patent Application Ser. No. 60/863,495, filed on Oct. 30, 2006.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Various programs allow viewers to view the program with a variety of different options. Among the different options include language selection, subtitle language selection, viewing vantage selection, and choice of commentary to name a few.

The different options are provided by means of different elementary streams. A program can have a number of different elementary streams, each elementary stream can provide, for example, an audio, a video, or a data selection.

Generally, a DVD movie or program is typically viewed with the simultaneous playing of audio and video selections, and in some cases, a data selection as well. In some cases, a user can decide to switch a particular selection, while leaving the other selections playing.

During such cases, it is desirable to seamlessly switch the particular selection while playing the other selections.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s), method(s), and apparatus for fast switching between elementary streams substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
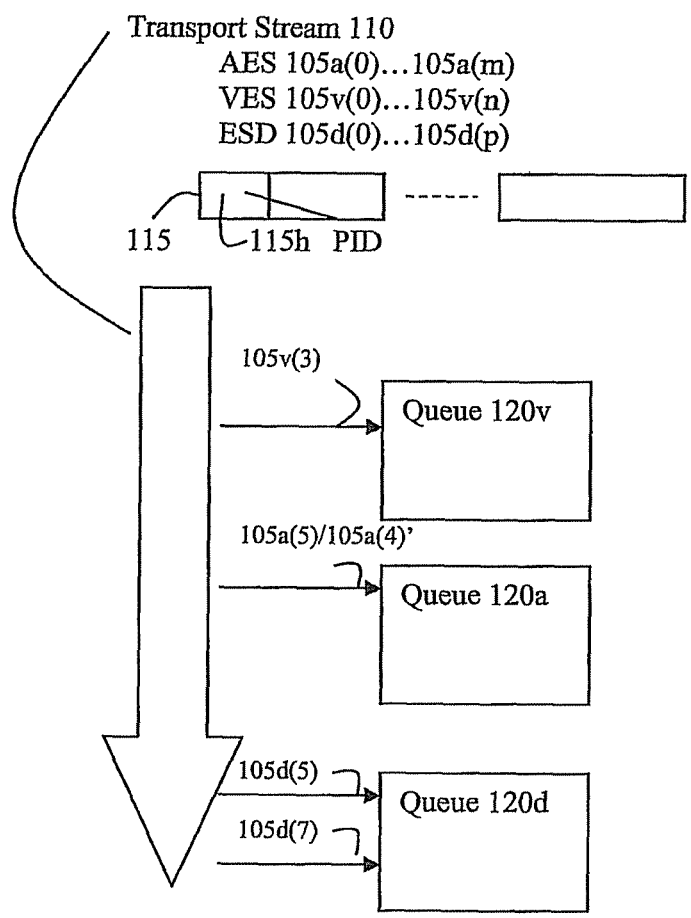
FIG. 1 is a block diagram describing the presentation of data streams in accordance with an embodiment of the present invention.

Referring now to FIG. 1, there is illustrated a block diagram describing the presentation of data streams in accordance with an embodiment of the present invention. A program can be associated with any number of video elementary streams $105v(0) \ldots 105v(m)$, audio elementary streams $105a(0) \ldots 105a(n)$, and elementary data streams $105d(0) \ldots 105d(p)$.

In an exemplary program, each video elementary stream $105v$ can provide, for example, video from a particular vantage point. Each audio elementary stream $105a$ can provide audio in different languages. Each elementary data stream $105d$ can provide sub-titles in different languages.

Generally, the presentation of the program involves the simultaneous display of at least one video elementary stream $105v$, at least one audio elementary stream $105a$, and any number of different elementary streams of data $105d$. Additionally, video elementary streams $105v$, audio elementary streams $105a$ and elementary streams of data $105d$ are associated with a time base. The elementary streams $105$ include time stamps that indicate the time for presentation of particular portions of the data. The time stamps can be compared to a local clock to synchronize the audio and video elementary streams $105$ as well as any elementary streams of data $105d$.

Each of the elementary streams $105$ are provided in a multiplexed stream $110$. A multiplexed stream can include, for example, a transport stream or a program stream. A transport stream is primarily used for transmission over a lossy medium, such as the internet, while a program stream is primarily used for transmission over a local medium, such as a bus. The multiplexed stream $110$ comprises a plurality of packets $115$. The packets $115$ comprise data from a particular one of the elementary streams $105$ and headers $115h$. The headers $115h$ include packet identifier fields PID identifying the particular elementary stream.

The selected elementary streams $105$ that are to be presented are filtered from the multiplexed stream $110$. For example, if a user desires to see a particular video elementary stream $105v(3)$, audio elementary stream $105a(4)$, and elementary streams of data $105d(5)$ and $105d(7)$, the multiplexed stream packets $115$ with PIDs associated with the foregoing elementary streams are filtered from the multiplexed stream $110$, while other packets are discarded.

The packets that are filtered are then placed in a queue associated therewith. For example, the queues may include an audio queue, video queue, and any number of data queues. The queues store the elementary streams for processing and presentation. The time stamps are used to process the elementary streams in synchronization.

A selected elementary stream $105$ can be changed. For example, an audio elementary stream $105a(4)$ can be changed to audio elementary stream $105a(5)$, while continuing presentation of video elementary stream $105v(3)$ and elementary streams of data $105d(5)$ and $105d(7)$.

When the selected elementary stream $105$ is changed, e.g., from audio elementary stream $105a(4)$ to elementary stream $105a(5)$, at least a portion of the formerly selected elementary stream, e.g., elementary stream $105a(4)$, may already be stored in the associated queue. Additionally, the different audio elementary streams $105a(0) \ldots 105a(m)$ may require a different codec for processing.

Flushing the queue of the portion of the formerly selected elementary stream that was placed in the queue prior to the selection change results in a condition where the time stamp for the front of the queue corresponds to the end of the other queues.

For example, if the originally selected elementary stream is elementary stream 105a(4), and was changed to elementary stream 105a(5), a portion of elementary stream 105a(4) would remain in the queue 120a when the elementary stream is changed to elementary stream 105a(5). If video elementary stream 105v(3) and elementary streams of data 105d(5) and 105d(7) are played simultaneously, flushing queue 120a would result in a condition where the head end of queue 120a would correspond to the time base of the tail end of queues 120v, 120d.

Accordingly, the portion of the previously selected elementary stream, e.g., audio elementary stream 105a(4)', that is in the queue 120a at the time of the selection change is left in the queue and processed. At the time of the selection change, multiplexed stream packets 110 associated with the newly selected elementary stream, e.g., audio elementary stream 105a(5), are filtered instead of the previously selected audio elementary stream 105a(4). Thus, at the completion of playing the portion 105a(4)', audio elementary stream 105a(5) is played. This transition occurs seamlessly with respect to playing video elementary stream 105v(3) and elementary streams of data 105d(5) and 105d(7).

Figure 2:
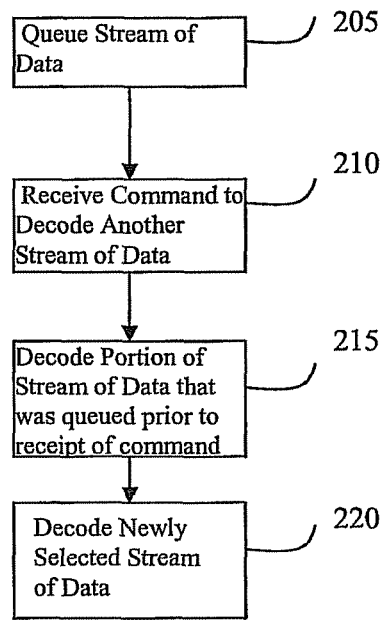
FIG. 2 is a flow diagram for presenting data streams in accordance with an embodiment of the present invention.

Referring now to FIG. 2, there is illustrated a flow diagram describing the presentation of data in accordance with an embodiment of the present invention. At 205, a stream of data, for example audio elementary stream 105a(4) is queued in a queue, for example 120a. At 210, a command is received to decode another stream of data, for example audio elementary stream 105a(5), instead of the current stream of data, e.g., audio elementary stream 105a(4).

After receiving the command, the portion of the originally decoded stream of data, e.g., audio elementary stream 105a(4), that was queued prior to receiving the command, e.g., audio elementary stream 105a(4)', is decoded at 215. After decoding the portion 105a(4)', at 220 the newly selected stream of data, audio elementary stream 105a(5), is decoded.

The foregoing can be used for rapid transitioning from one media stream to another media stream during a multimedia presentation. In certain embodiments of the present invention, the transition from one media stream to another media stream can be seamless with respect to the continuous presentation of other media. For example, during the presentation of a movie, including the presentation of video and audio, the audio stream can be switched to another audio stream, such for example the audio in another language, in a manner that is seamless with respect to the video and appears relatively continuous to the viewer.

In certain embodiments, the streams of data can include data that is compressed in accordance with a variety of data compression standards. For example, the Motion Pictures Experts Group (MPEG) has promulgated a number of different standards for video data compression, such as MPEG-2, and Advanced Video Compression (AVC), and audio compression, MPEG-1 and MP3. Certain embodiments of the present invention can be used with streams of data that include audio and video data that is compressed in accordance with the foregoing standards.

Figure 3:
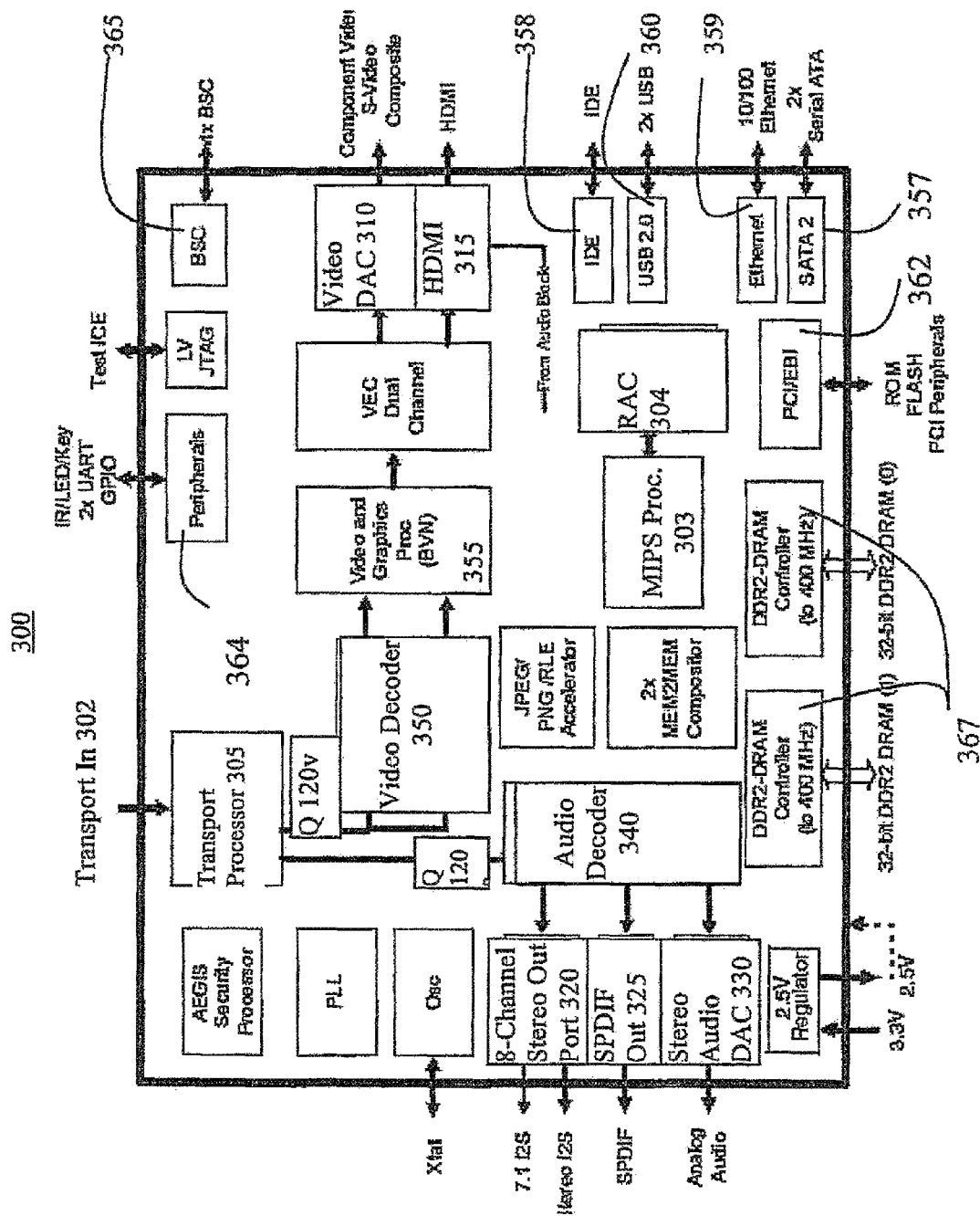
FIG. 3 is a block diagram of an exemplary decoder in accordance with an embodiment of the present invention.

Referring now to FIG. 3, there is illustrated a block diagram of an exemplary DVD integrated circuit 300 in accordance with an embodiment of the present invention. The integrated circuit 300 can provided a highly integrated silicon platform for High Definition DVD players. It may be also be used in conjunction with a separate encoder.

The integrated circuit 300 receives a multiplexed stream 110 at input 302 that carries a plurality of elementary streams 105, and presents the data from selected elementary streams 105 for presentation. The video data from the selected video elementary stream(s) can be output in Component Video, or S-Video via video digital to analog converter (DAC) 310, and HDMI via HDMI output port 315. The analog data from the selected analog elementary stream(s) can be output in 7.1 Channel Output format or Stereo I2S format via 8 Channel/Stereo output port 320, SPDIF format from SPDIF output port 325, and analog via Stereo Audio Digital Audio Converter 330.

The integrated circuit 300 can include a core processor 303, such as, for example, a 4350 dual-thread MIPS processor supporting HD-DVD and BD graphics, HD-DVD and BD Navigation, interconnectivity, content protection and decryption, and a floating point unit for graphics (font rendering) and JAVA support. The core processor can include a multimedia unit, 32K/16K instruction, 32K data cache, and a 128K read ahead cache (RAC) 304 for performance.

The integrated circuit 300 can include a multiplexed stream processor 305 for receiving a multiplexed stream 110. As noted above, the multiplexed stream 110 comprises a plurality of packets 115 carrying from particular elementary streams 105 and headers 115h. The headers 115h include packet identifier fields PID identifying the particular elementary stream.

The multiplexed stream processor 305 receives a multiplexed stream via input 302 and filters selected elementary streams 105 that are to be presented from the multiplexed stream 110. The multiplexed stream 110 includes multiplexed packets 115 with PIDs identifying different elementary streams. The multiplexed stream processor 305 parses the multiplexed packet 115 headers 115h, examining the PIDs, and filters the selected audio elementary streams and video elementary streams. The multiplexed stream processor 305 provides the filtered audio elementary streams 105a to an audio decoder 340 via audio queues 120a, and the filtered video elementary streams 105v to a video decoder 350 via video queues 120v.

A selected elementary stream 105 can be changed. For example, an audio elementary stream 105a(4) can be changed to audio elementary stream 105a(5), while continuing presentation of video elementary stream 105v(3) and elementary streams of data 105d(5) and 105d(7).

When the selected elementary stream 105 is changed, e.g., from audio elementary stream 105a(4) to elementary stream 105a(5), at least a portion of the formerly selected elementary stream, e.g., elementary stream 105a(4), may already be stored in the associated queue. Additionally, the different audio elementary streams 105a(0) . . . 105a(m) may require a different codec for processing.

The portion of the previously selected elementary stream, e.g., audio elementary stream 105a(4)', that is in the queue 120a at the time of the selection change is left in the queue and processed. At the time of the selection change, multiplexed packets 110 associated with the newly selected elementary stream, e.g., audio elementary stream 105a(5), are filtered instead of the previously selected audio elementary stream 105a(4). Thus, at the completion of playing the portion 105a(4)', audio elementary stream 105a(5) is played. This transition occurs seamlessly with respect to playing video elementary stream 105v(3) and elementary streams of data 105d(5) and 105d(7).

In certain embodiments of the present invention, the change of elementary streams can be responsive to receipt of a command to switch received at port 364. In certain embodiments of the present invention, the multiplexed stream processor 305 can insert an indicator or marker between the portion of the previously selected stream of data, e.g., audio elementary stream 105a(4)' and the newly selected stream of data, e.g., audio elementary stream 105a(5). The marker can indicate a change in data streams.

Video Decoder

The video decoder 350 decodes video elementary streams provided by the video queue 120v. The video decoder 350 can transition from one selected video elementary stream to another. In certain embodiments of the present invention, the video decoder 350 is operable to detect a marker indicating a change of selected video elementary stream in the video queue 120v. Responsive thereto, the video decoder 350 changes the codec associated with the previously selected video elementary stream to a codec associated with the newly selected video elementary stream. In certain embodiments, the arrival of the marker at the video decoder 350 can cause an interrupt. The interrupt can cause the video decoder 350 to switch to the appropriate codec.

The video decoder 350 can be equipped with codecs to decode video data compressed in accordance with Advanced Video Coding (AVC, also known as H.264, and MPEG-4, Part 10), SMPTE VC-1 Advanced Profile Level 3, SMPTE VC-1 Simple Profile to Medium Level, and SMPTE VC-1 Main Profile to High Level. The video decoder 350 can be capable of simultaneous single high definition and standard definition decoding.

The video decoder 350 provides decoded and decompressed video to a video and graphics processor 355. In certain embodiments, the video and graphics processor 355 can provide any of the following features:

- Hardware support for two content and user interaction-driven 2D graphics planes with full HD resolution—Presentation Graphics Plane
- Foreground (Interactive) Graphics Plane
- Vendor OSD graphics overlay plane (in addition to the two planes described above), overlays all graphics and video planes)
- Alpha-blending capabilities on all planes
- Simultaneous support for HD and SD output of the same content and graphics
- Select between overlay plane only or scaled version of composite output for secondary outputs
- Video Scaler: Horizontal and vertical with programmable zooming (frame by frame); independently configured for each video stream
- Alpha blending capabilities Three levels of graphics, two video HD-DVD Clear Rect Function on secondary video plane
- Motion adaptive de-interlacer
- Thomson Film Grain insertion technology (FGT)
- Main Output Compositor with five inputs Three graphics feeds and two video feeds
- Component outputs can output a reduced resolution version of the full HD signal if the corresponding AACS-defined flag is set by the content provider (DVO and HDMI outputs must remain at full resolution).
- A single output image is then sent to the VEC (video encoder) which converts it to the various analog and digital output formats (composite video, S-video, RF video, component video, HDMI, DVI, etc).

Audio Decoder

The audio decoder 340 receives and decodes the audio data from the selected audio elementary streams and provides the decoded audio data to the 8 Channel/Stereo output port 320, SPDIF output port 325, and Stereo Audio Digital Audio Converter 330.

The audio decoder 340 decodes audio elementary streams provided by the audio queue 120a. The audio decoder 340 can transition from one selected audio elementary stream to another. In certain embodiments of the present invention, the audio decoder 340 is operable to detect a marker indicating a change of selected audio elementary stream in the audio queue 120a. Responsive thereto, the audio decoder 340 changes the codec associated with the previously selected audio elementary stream to a codec associated with the newly selected audio elementary stream. In certain embodiments, the arrival of the marker at the audio decoder 340 can cause an interrupt. The interrupt can cause the audio decoder 340 to switch to the appropriate codec.

The audio decoder 340 can include any of the following features:

Audio Standards
  LPCM to 7.1 channels
  MPEG audio
  MPEG-1 Layer III (MP3) to stereo
  Dolby Digital (AC3) to 5.1 channels
  Dolby Digital Plus to 7.1 channels
  Dolby TrueHD MLP (Compressed LPCM)—DTS to 5.1 channels DTS—HD to 7.1 channels
  MPEG-4 High-Efficiency AAC to 5.1 channels WMA Pro LPCM
  MLP (Compressed LPCM) aka Dolby TrueHD—AAC-HE (IP-STB)
  Dolby Digital multi-channel Bass Management support, with equivalent support for DTS
  PCM audio mixing and post processing—Primary and Secondary decoded streams with:
    Audio clips input over Host I/F or from stream input
    Individually controlled mixing and fading
  Speaker Management Capabilities; minimum support for "Small," "Large," and "Off" settings
  PCM audio mixing and post-processing
    Mix primary and secondary decoded streams with effects sounds (PCM)
    Individually controlled mixing and fading
    Re-encode result of mixed primary and secondary programs and PCM effects for S/PDIF or HDMI output:
    Formats: AC-3 5.1, DTS 5.1

The integrated circuit 300 can include a number of system interfaced, including, for example, Dual SATA interfaces 357, Parallel IDE interface 358, 10/100 Base T Ethernet Port 359, Dual USB 2.0 host ports 360, 32-bit PCI v2.2 33-MHz Master/Target interface/EBI Parallel Bus 362, Dual UART interface/GPIO/User interface pins 364, Serial Controller (SC) ports 365, NAND flash support, external FLASH support. The integrated circuit 300 can also include a number of different memory interfaces, such as DDR Interfaces 367, and SDRAM controllers.

In certain embodiments of the present invention, the integrated circuit can consume 7.0 W in full operation (simultaneous HD and SD decoding, dual audio programs, and full graphics package running). The integrated circuit 300 can also include a power down mode that reduces the power consumption from the active state by a minimum of 90% or the level required by phase 2 of the EnergyStar specification for DVD devices (<1 Watt). In the foregoing state, the processor and user interface remain active. The supply voltage for the core may be 1.2V, the DDR interface 367 supply voltage may be 1.8V, and the PCI/EBI/GPIO interface 362 voltage may be 3V. The integrated circuit 300 can also include a voltage regulator that provides 2.5V from a 3.3V input and outputs it on a power pin for use on the integrated circuit 2.5 inputs.

In one embodiment of the present invention can comprise a chip with each of the aforementioned structures integrated thereon, and further comprising a plurality of pins that are electrically connected to the various input and output ports thereby providing access to external structures.

Figure 4:
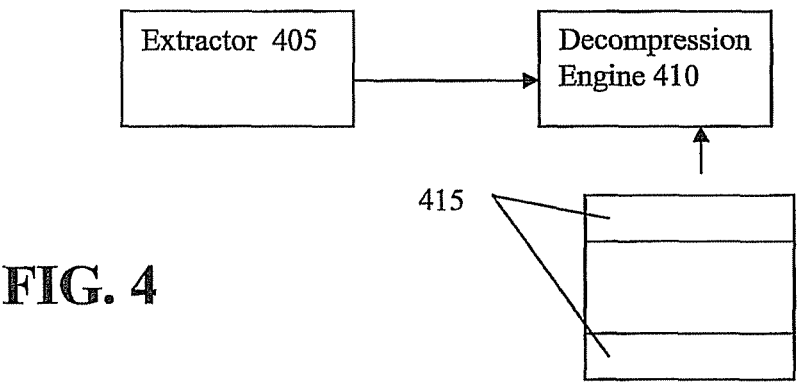
FIG. 4 is a block diagram of an exemplary decoder in accordance with an embodiment of the present invention.

Referring now to FIG. 4, there is illustrated a block diagram describing an exemplary decoder 305 in accordance with an embodiment of the present invention. The decoder comprises an extractor 405, a decompression engine 410, and a plurality of codecs 415. In certain embodiments of the present invention, decoder 305 could comprise a video decoder 350, wherein the decompression engine 410 comprises a video decompression engine and the plurality of codecs 415 comprise video codecs. In certain embodiments of the present invention, decoder 305 could comprise a audio decoder 340, wherein the audio decompression engine 410 comprises an audio decompression engine and the plurality of codecs 415 comprise audio codecs.

The decompression engine 410 loads a codec associated with a selected elementary stream and decodes data provided by the queue 120. When the elementary stream changes, the extractor 405 generates an interrupt to the decompression engine 410. The interrupt causes the decompression engine 410 to change the codec 415 to the codec associated with the newly selected elementary stream.

In certain embodiments of the present invention, a marker from the queue 120 causes the extractor 405 to generate an interrupt to the decompression engine 410. In other embodiments, the extractor 405 can detect the change in the elementary stream and interrupt the decompression engine 410.

Figure 5:
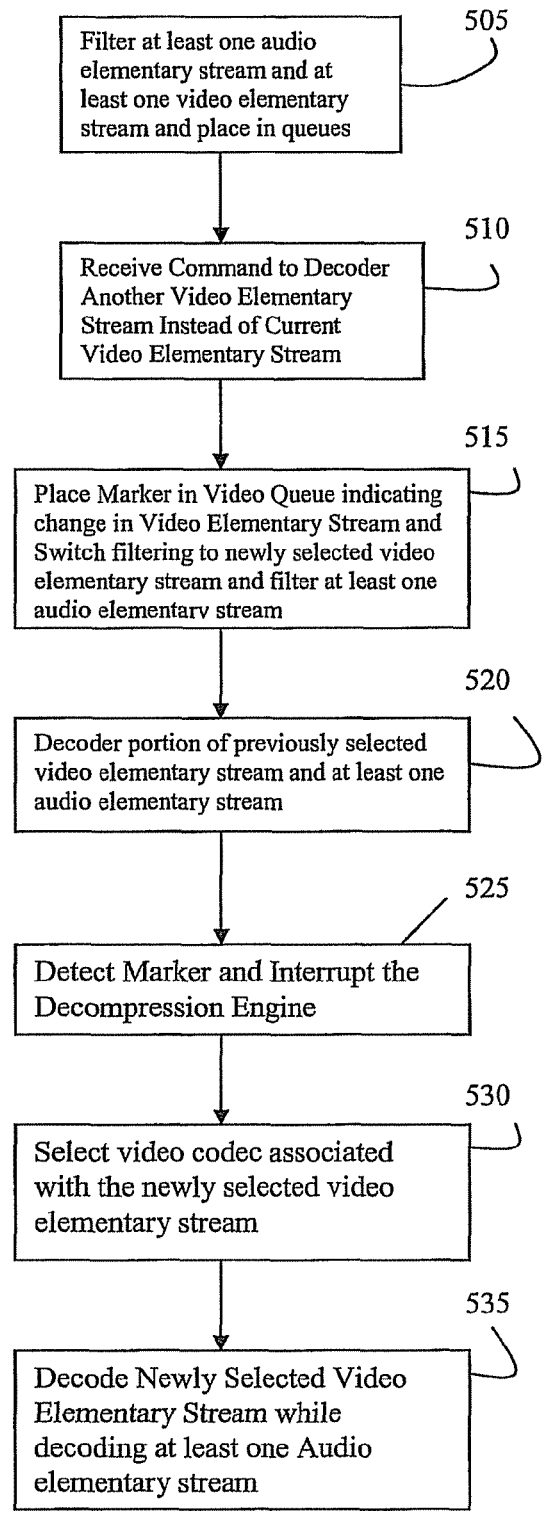
FIG. 5 is a flow diagram for presenting data streams in accordance with an embodiment of the present invention.

Referring now to FIG. 5, there is illustrated a flow diagram for presenting multimedia data in accordance with an embodiment of the present invention. At 505, multiplexed stream processor 305 filters at least one audio elementary stream and at least one video elementary stream and places the filtered elementary streams in respective audio queues 120a and video queues 120v. At 510, a command is received by the multiplexed stream processor via port 364 to decode another video elementary stream(s) of data associated with the same program, instead of the current at least one video elementary stream. At 515, the multiplexed stream processor 305 places a marker in the video queue 120v indicating the change in the selected video elementary stream(s), switches filtering to the newly selected video elementary stream(s) while continuing to filter the at least audio elementary stream.

After receiving the command, the portion of the previously selected at least one video elementary stream that was queued prior to receiving the command is decoded by video decoder 350 while audio decoder 340 continues to decode the at least one audio elementary stream at 520. After decoding the portion at 525, the extractor 405 of the video decoder 350 detects the marker indicating the newly selected video elementary stream(s) and interrupts the video decompression engine 410. At 530, the video decompression engine 410 selects a video codec associated with the newly selected video elementary stream(s). At 535, the video decoder 350 decodes the newly selected video elementary stream(s), while the audio decoder 340 decodes the at least one audio elementary stream.

The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on VC-1, H.264, and MPEG-2 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method comprising:
receiving, by a decoder comprising an extractor and a decompression engine, multiple data streams, including a first data stream and a second data stream;
storing a first data from the first data stream in a buffer;
initiating decoding, by the decompression engine, from the buffer, of the first data from the first data stream;
receiving, from the extractor, a command to switch to decoding the second data stream instead of the first data stream, prior to decoding all of the first data;
despite receiving the command to switch to decoding the second data stream,
continuing to decode the first data in the buffer that was present in the buffer prior to receipt of the command, until the first data is decoded; and
after the first data is decoded, switching to decoding, by the decompression engine, a second data from the second data stream as commanded.

2. The method of claim 1, further comprising:
receiving a transport stream that includes the multiple data streams.

3. The method of claim 1, further comprising:
receiving a program stream that includes the multiple data streams.

4. The method of claim 1, further comprising:
receiving a packetized data stream as the first data stream.

5. The method of claim 1, where:
the first data stream comprises a first audio data stream; and
the second stream comprises a second audio data stream.

6. The method of claim 1, where:
the first data stream comprises a first video data stream; and
the second stream comprises a second video data stream.

7. The method of claim 1, further comprising:
receiving an identifier of the first data stream.

8. The method of claims 1, further comprising:
filtering the multiple data streams to obtain at least one of the first data and the second data.

9. A system comprising:
a buffer; and
a stream processor, comprising a decoder having an extractor and a decompression engine, in communication with the buffer, the stream processor operable to:
receive a multiplexed data stream having at least first and second data streams;
filter first data from the first data stream from the multiplexed data stream;
store the first data in the buffer;
initiate decoding, by the decompression engine, of the first data;
making a determination, by the extractor, to switch to decoding the second data stream instead of the first data stream after the first data is stored in the buffer;
despite determining to switch to decoding the second data stream, continue to decode the first data that was present in the buffer prior to the determination to switch until the first data is processed; and
after the first data is decoded, switch to decoding, by the decompression engine, the second data stream.

10. The system of claim 9, where the stream processor is further configured to insert a marker after the first data, and where the marker causes the interrupt.

11. The system of claim 10, further comprising:
the decoder operable to select different codecs for decoding the first data stream and the second data stream in response to the interrupt.

12. The system of claim 11, where the decoder comprises an audio decoder.

13. The system of claim 11, where the decoder comprises a video decoder.

14. The system of claim 9, where the stream processor is operable to initiate decoding by initiating decompression.

15. The system of claim 9, where the multiplexed data stream comprises a program stream.

16. The system of claim 9, where the multiplexed data stream comprises a transport stream.

17. A system comprising:
a buffer; and
a stream processor, comprising a decoder having an extractor and a decompression engine, in communication with the buffer, the stream processor operable to:
receive a multiplexed data stream having at least first and second data streams;
obtain first data from the first data stream in the multiplexed data stream;
buffer the first data in the buffer;
insert a marker after the first data;
obtain and discard second data from the second data stream in the multiplexed data stream;
initiate processing, by the decompression engine, of the first data;
determine, by the extractor, to switch to processing the second data stream instead of the first data stream after the first data is buffered, and in response store additional data from the second data stream after the first data in the buffer;
despite determining to switch to processing the second data stream, continue to process the first data in the buffer until the first data is processed; and
after the first data is processed, switch to processing, by the decompression engine, the additional data.

18. The system of claim 17, the decoder operable to select a different codec for decoding the second data stream instead of the first data stream in response to the marker, where the first data stream is of a different stream type than second data stream.

19. The system of claim 17, where the switch comprises a switch between different audio streams that is seamless with respect to a video stream also being presented.

20. The system of claim 17, where the buffer comprises queues assigned to specific stream types.

* * * * *